(12) United States Patent
de Paula et al.

(10) Patent No.: US 11,530,740 B2
(45) Date of Patent: Dec. 20, 2022

(54) BALL-SCREW NUT WITH OVER-MOLDED SHELL

(71) Applicant: Schaeffler Technologies AG & Co. KG, Herzogenaurach (DE)

(72) Inventors: Renato de Paula, Sterling Heights, MI (US); Mario Kreutzer, Sonneberg (DE); Dieter Adler, Schönwald (DE); Michael Zinnecker, Berkley, MI (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 417 days.

(21) Appl. No.: 16/562,649

(22) Filed: Sep. 6, 2019

(65) Prior Publication Data
US 2021/0071743 A1   Mar. 11, 2021

(51) Int. Cl.
*F16H 25/22* (2006.01)
*F16H 25/24* (2006.01)

(52) U.S. Cl.
CPC ..... *F16H 25/2223* (2013.01); *F16H 25/2233* (2013.01); *F16H 2025/2481* (2013.01)

(58) Field of Classification Search
CPC ............. F16H 25/2223; F16H 2025/2481
See application file for complete search history.

(56) References Cited

U.S. PATENT DOCUMENTS

| | | | |
|---|---|---|---|
| 4,186,621 A | 2/1980 | Enzo | |
| 5,653,145 A | 8/1997 | Kobayashi et al. | |
| 6,192,585 B1* | 2/2001 | Buchanan, Jr. | B21D 53/24 29/898.06 |
| 6,668,672 B2 | 12/2003 | Kuo et al. | |
| 7,758,086 B2 | 7/2010 | Slunick et al. | |
| 9,022,193 B2* | 5/2015 | McCrary | F16D 43/02 192/41 R |
| 2002/0063014 A1* | 5/2002 | Yoshida | F16D 1/0858 180/444 |
| 2019/0264787 A1* | 8/2019 | Doppler | F16H 25/2015 |

FOREIGN PATENT DOCUMENTS

| | | |
|---|---|---|
| DE | 102017105732 A1 | 4/2018 |
| KR | 20150076496 A | 7/2015 |
| WO | 2018091034 A1 | 5/2018 |

* cited by examiner

*Primary Examiner* — Jake Cook

(57) ABSTRACT

A ball-screw actuator includes a screw nut having a metal core and an over-molded plastic outer shell. The plastic outer shell includes features which would be expensive to manufacture in a single piece metal screw nut, such as an anti-rotation feature, an axial position control feature, and a lateral position control feature. The anti-rotation feature may take the form of an axial groove or of an axial ridge.

13 Claims, 5 Drawing Sheets

BALL-SCREW NUT WITH OVER-MOLDED SHELL

TECHNICAL FIELD

The disclosure concerns a ball screw actuator. More particularly, the disclosure concerns a ball screw actuator in which the ball screw nut includes a metal core and an over-molded plastic outer shell.

BACKGROUND

Ball-screws are a type of linear actuator which translate a rotational input, such as from an electric motor, into a linear movement. Ball-screw actuators include a shaft, called a spindle, having external threads and a nut having internal threads. A set of balls radially separate the spindle from the nut and permit relative rotation with minimal resistance. In some ball-screw actuators, the spindle is rotated causing the nut to move axially. In other ball-screw actuators, the nut is rotated causing the spindle to move axially. In some embodiments, the threading of the nut includes recirculation paths which keep the balls at a specified axially location with respect to the nut. In other embodiments, other mechanisms may be used to relocate the balls to a desired axial location during unloaded periods.

SUMMARY

A method of manufacturing an actuator includes fabricating a hollow metal screw nut core and using a plastic over-molding process to add a plastic outer shell. The hollow screw nut core has internal threads. The screw nut core and plastic outer shell form a screw nut. The plastic outer shell includes an anti-rotation feature. The plastic outer shell may also include an axial position control feature and/or a lateral position control feature. The method may also include knurling at least a portion of an exterior surface of the screw nut core prior to adding the plastic outer shell. A plurality of recirculation units may be inserted into the screw nut core from an interior to establish recirculation paths in the internal threads. A locating feature may be used to orient the screw nut core within a mold during the over-molding process such that thicker portions of the plastic outer shell covers locations of the recirculation units.

An actuator includes a screw nut, a spindle, and a plurality of rolling elements. The screw nut includes a metal core and a plastic over-molded outer shell. The metal core has internal threads. A portion of an exterior surface of the core may be knurled. The plastic over-molded outer shell has an anti-rotation feature configured to engage a mating feature of a housing to prevent relative rotation therebetween. The plastic outer shell may also include an axial position control feature and/or a lateral position control feature. A plurality of recirculation units may be inserted into the core from an interior to establish recirculation paths in the internal threads.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
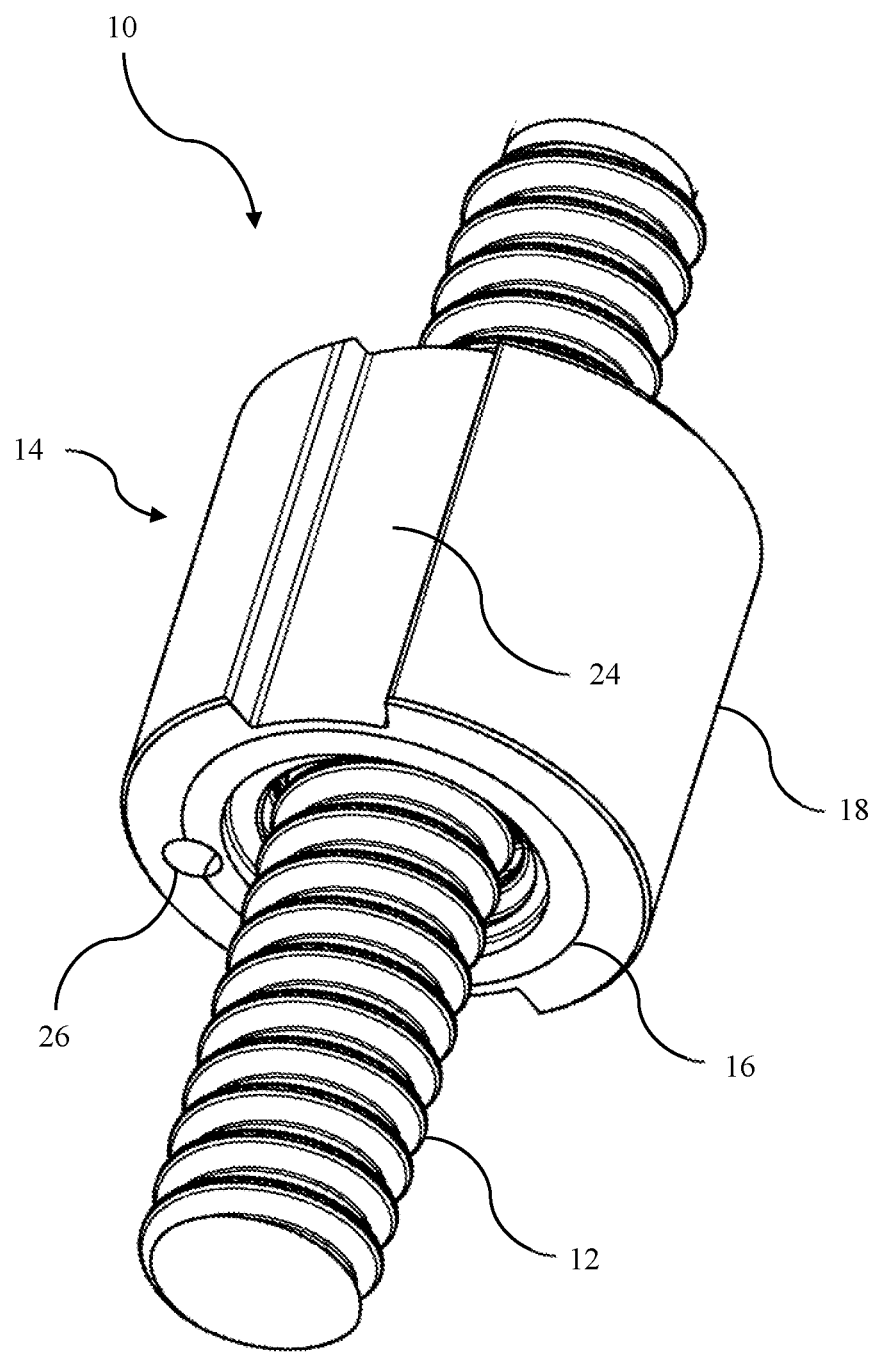
FIG. 1 is a pictorial view of a first embodiment of a ball screw actuator.
Figure 2:
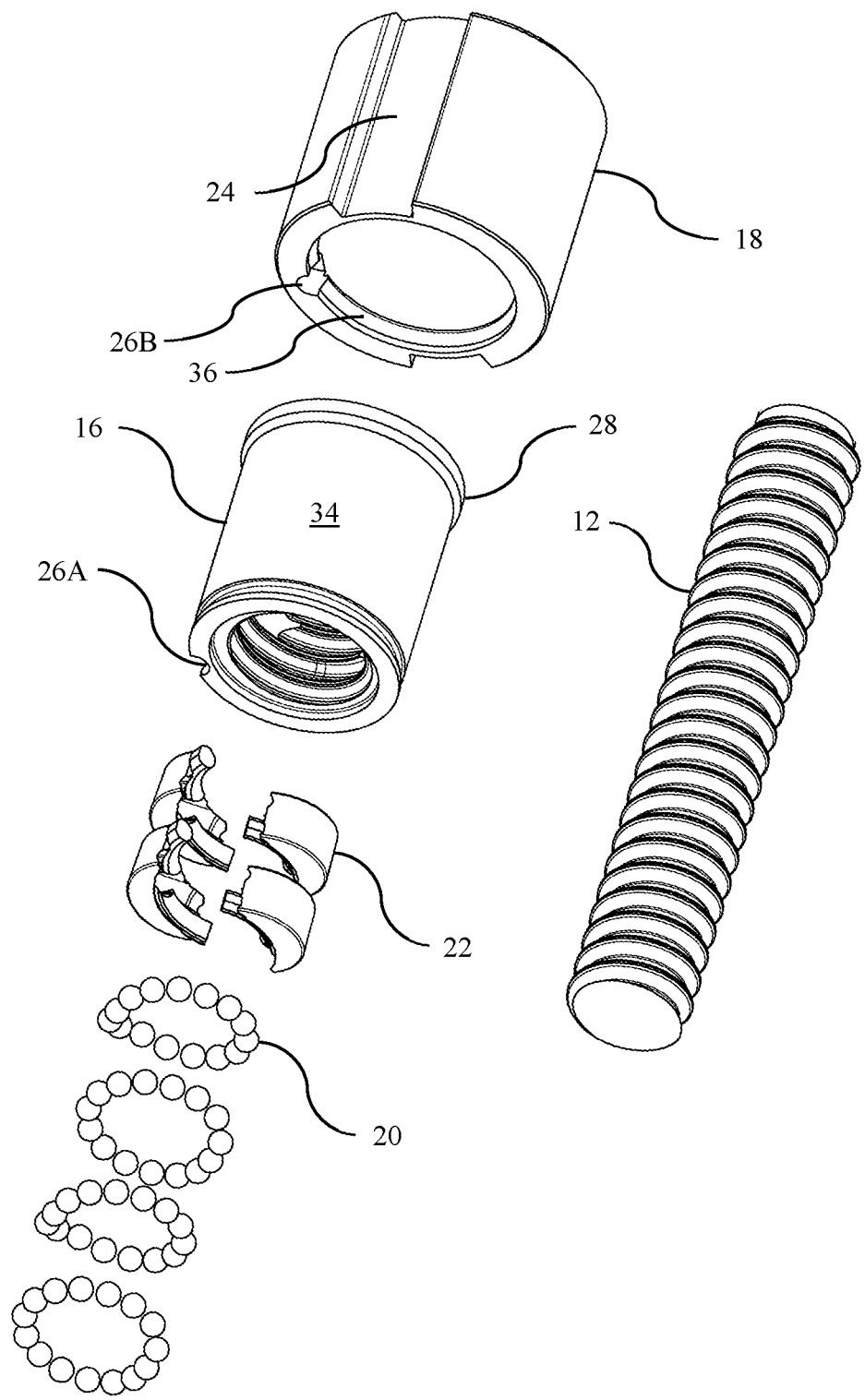
FIG. 2 is an exploded view of the ball screw actuator of FIG. 1.

FIG. 1 shows an embodiment of a ball-screw actuator 10, including a spindle 12 and screw nut 14. FIG. 2 is an exploded view of this embodiment, revealing certain internal details. Screw nut 14 includes a metal screw-nut core 16 and a plastic outer shell 18 which is over-molded onto the screw-nut core. An internal surface of the metal screw-nut core is threaded. A number of rolling elements 20 are held between the threads of the screw-nut core and the threads of the spindle. Several recirculation units 22 are inserted from the hollow interior of the screw nut-core to redirect the rolling elements from one thread to an adjacent thread. In this way, the rolling elements are grouped into a number of rings of rolling elements that stay within a limited number of threads of the screw-nut core even as the spindle moves a substantial distance axially relative to the screw-nut core.

Notably, the screw-nut core does not include any anti-rotation feature. This makes the part simpler and cheaper to manufacture. Instead, at least one anti-rotation feature 24 is formed in the plastic over-molded outer shell 18. In this embodiment, there are two anti-rotation features, each of which is a channel extending axially along an outer surface of the outer shell IS. These channels are configured to engage an axial rib in a housing to prevent rotation of the screw-nut with respect to the housing. A locating feature 26 or cavity is formed in one end of the screw-nut at the interface between the core and the outer shell. Locating feature 26 or cavity orients the screw nut core within the mold during the over-molding process, such that the thicker portions of the plastic outer shell can be aligned over the recirculation units 22. Aligning the outer shell relative to the recirculation units is advantageous because the screw nut core is thinner in the vicinity of the recirculation units. In this embodiment, the locating feature or cavity is partially in the screw nut core and partially in the plastic outer shell. The locating feature or cavity can be defined by a first portion 26A arranged on a radial outer surface 34 of the metal screw nut core 16 and a second portion 26B arranged on a radial inner surface 36 of the plastic outer shell 18. The locating feature 26 or cavity extends axially within the screw nut such it forms an axially extending blind bore or blind cavity. In other embodiments, the locating feature may be entirely within the screw nut core. A portion 28 of the core may be knurled to improve adhesion between the plastic outer shell and the core.

Figure 3:
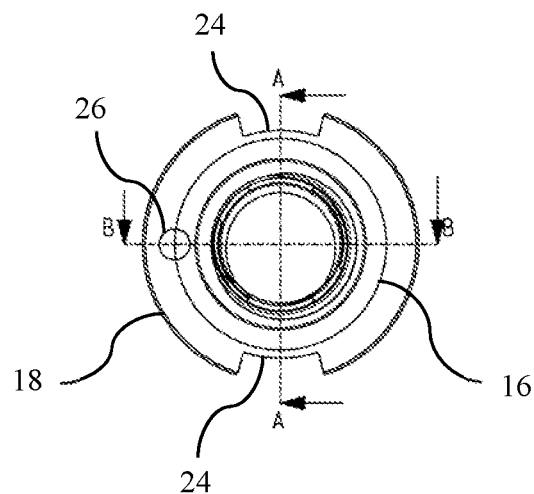
FIG. 3 is an end view of the ball screw actuator of FIG. 1.
Figure 4:
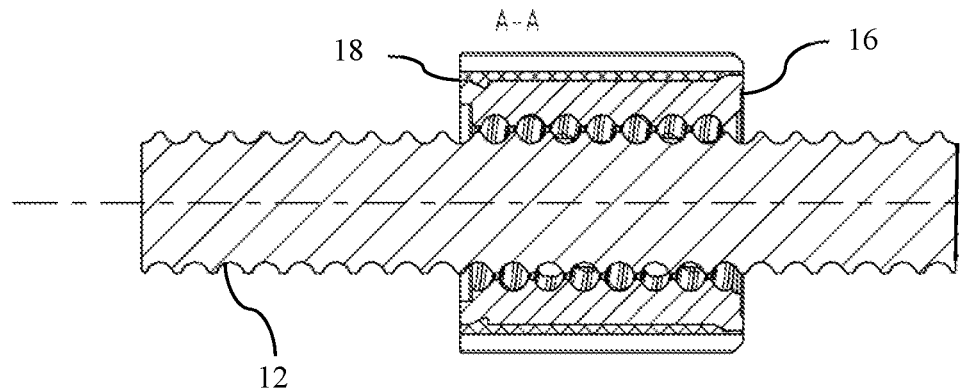
FIG. 4 is a first cross-sectional view of the ball screw actuator of FIG. 1.
Figure 5:
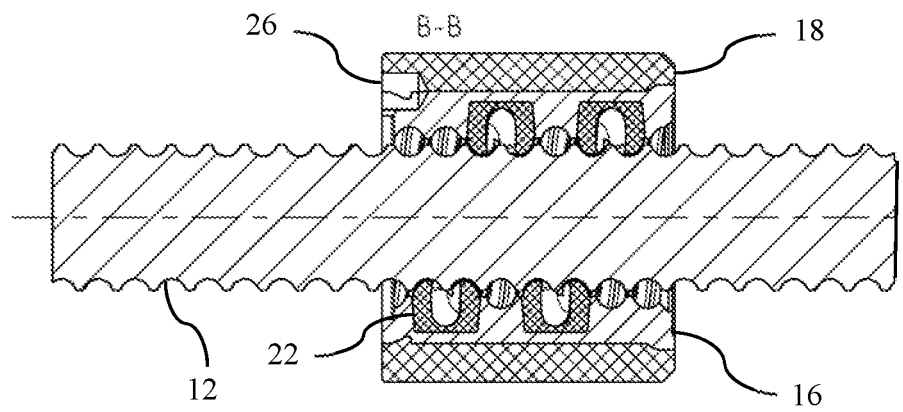
FIG. 5 is a second cross-sectional view of the ball screw actuator of FIG. 1.

FIG. 3 shows an end view of the actuator. In this view, the anti-rotation features 24 are clearly visible. FIG. 4 is a cross section of the actuator taken through the anti-rotation features. Note that the radial thickness of the plastic shell 18 is relatively thin at these circumferential locations. FIG. 5 is a cross section of the actuator taken at a circumferential location between anti-rotation features. Note that the radial thickness of the plastic shell 18 in FIG. 5 is relatively thick. In this embodiment, locating feature 26 is circumferentially located between anti-rotation features.

Figure 6:
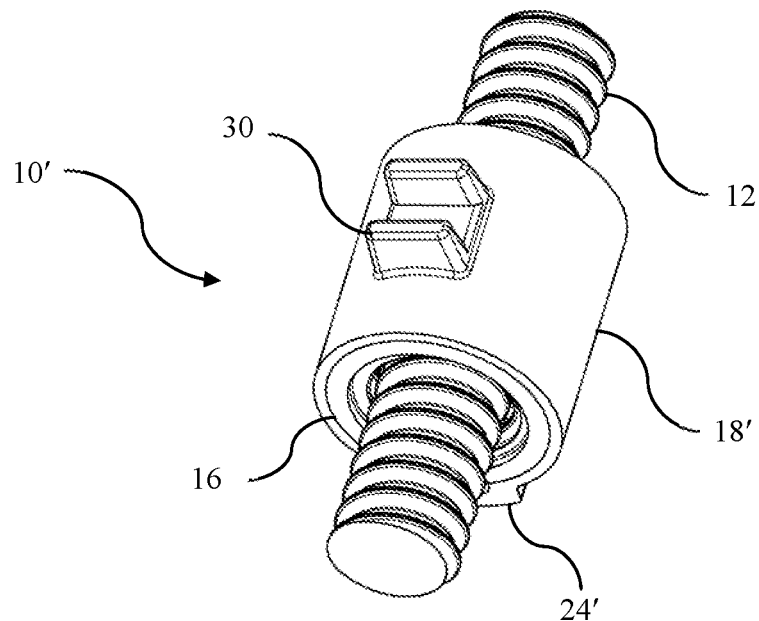
FIG. 6 is a first pictorial view of a second embodiment of a ball screw actuator.
Figure 7:
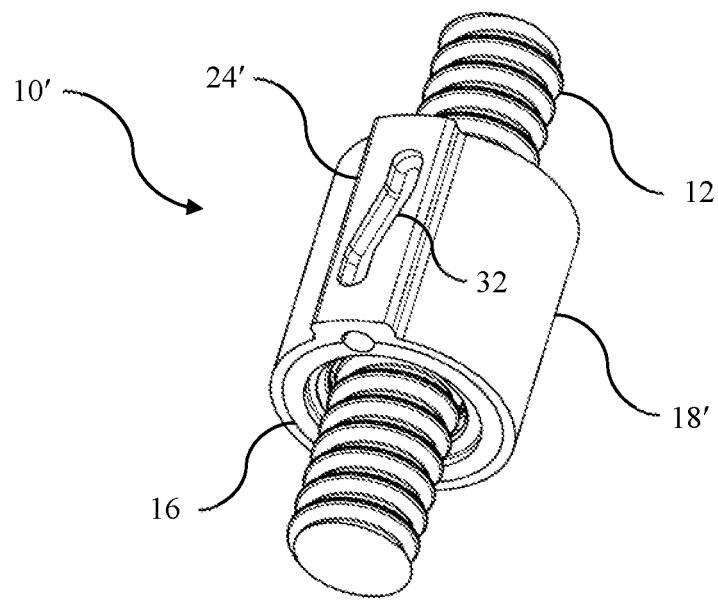
FIG. 7 is a second pictorial view of the ball screw actuator of FIG. 6.

FIGS. 6 and 7 show a second embodiment 10'. This embodiment includes an axial position control feature 30 molded into the plastic outer shell 18'. This feature exerts an axial force on an external component such that the external component moves parallel to the axis of the spindle 12 in response to rotation of the spindle. In this embodiment, the axial position control feature takes the form of two radial projections which could, for example, engage a fork that engages a synchronizer in a layshaft transmission.

As best seen in FIG. 7, the anti-rotation feature 24' of this embodiment is a ridge that extends axially along the outer surface of outer shell 18'. This ridge is configured to engage a channel in a housing to prevent rotation of the screw-nut relative to the housing. In this embodiment, locating feature 26 is circumferentially aligned with the anti-rotation feature 24'. A track 32 is formed in the anti-rotation feature 24'. A portion of this track runs diagonally with respect to the spindle axis. A follower which is constrained axially but moveable laterally may engage this track. The lateral position of the follower is thereby a function of the axial position of the screw nut.

Figure 8:
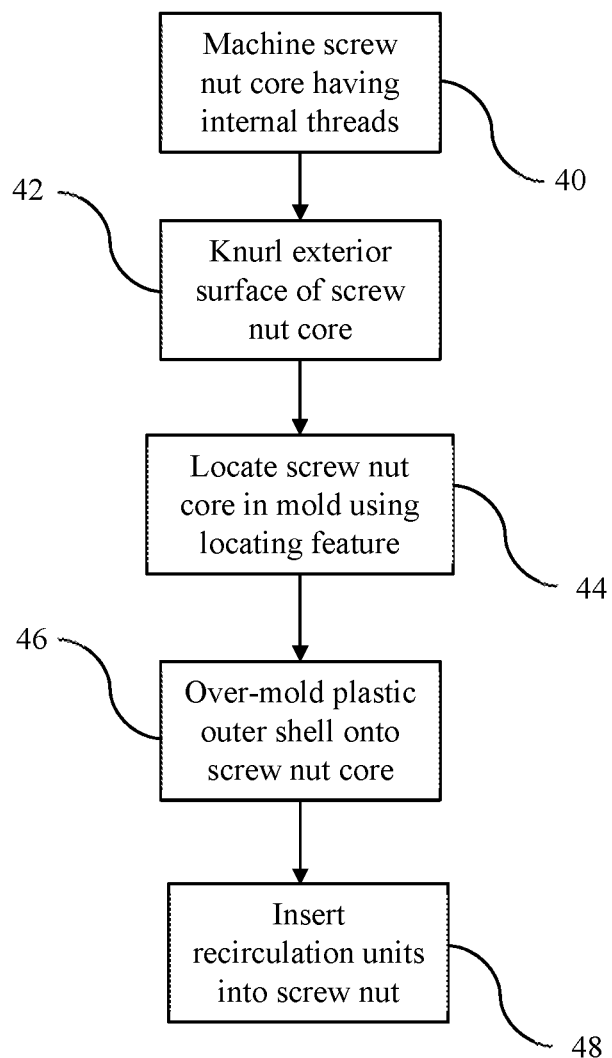
FIG. 8 is a flow chart for a method of manufacturing the ball screw actuators of FIGS. 1 and 6.

FIG. 8 illustrates a process for manufacturing the actuators of FIGS. 1-5 and 6-7. At 40, screw nut core 16 is machined from metal. Alternatively, it could be formed by casting, 3D printing, or other form of metal fabrication. At 42, at least a portion of an outer surface of screw nut core is knurled to create a textured surface which will bond better with plastic outer shell 18 or 18'. At 44, the screw nut core is placed into a mold and oriented using locating feature 26. A plastic over-molding process is used at 46 to form the plastic outer layer 18 or 18' and adhere the outer shell to the core. The mold is shaped to form anti-rotation features 24 or 24' and optionally axial position control feature 30 and/or lateral position control feature 32. At 48, recirculation units 22 are inserted from an interior of the hollow screw nut core. To complete assembly, spindle 12 and rolling elements 20 are inserted into the screw nut and the actuator assembly is inserted into a housing.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. An actuator comprising:
   a screw nut having a metal core and a plastic over-molded outer shell, the metal core having internal threads, and the outer shell having an anti-rotation feature configured to engage a mating feature of a housing to prevent relative rotation therebetween;
   a spindle extending through the screw nut, the spindle having external threads;
   a plurality of rolling elements disposed between the external threads and the internal threads; and
   a locating feature configured to orient the metal core for a molding process of the screw nut, the locating feature configured as a cavity that extends axially from an end of the metal core.

2. The actuator of claim 1 wherein the locating feature: extends axially from an end of the screw nut; and includes a first portion arranged on an outer surface of the metal core, and a second portion arranged on the plastic outer shell.

3. The actuator of claim 2 wherein the first and second portions form a blind bore.

4. An actuator comprising:
   a screw nut having a metal core and a plastic over-molded outer shell, the metal core having internal threads, and the outer shell having an anti-rotation feature configured to engage a mating feature of a housing to prevent relative rotation therebetween;
   a spindle extending through the screw nut, the spindle having external threads;
   a plurality of rolling elements disposed between the external threads and the internal threads; and
   a locating feature configured to orient the metal core for a molding process of the screw nut; and
   the internal threads define recirculation paths arranged radially inwardly of an outer surface of the metal core.

5. The actuator of claim 1 wherein the anti-rotation feature is a groove extending axially along an outer surface of the plastic outer shell.

6. The actuator of claim 5, further comprising insertable recirculation units configured to redirect rolling elements from a first thread to a second thread adjacent to the first thread, and the groove is arranged circumferentially between recirculation units.

7. The actuator of claim 1 wherein the locating feature is arranged on an outer surface of the metal core.

8. A screw nut for a ball-screw actuator, the screw nut comprising:
- a metal core having:
  - internal threads; and
  - a plurality of insertable recirculation units configured to redirect rolling elements from a first internal thread to a second internal thread adjacent to the first internal thread, the plurality of insertable recirculation units and internal threads defining recirculation paths configured for the railing elements;
- a plastic over-molded outer shell having an anti-rotation feature configured to engage a mating feature of a housing to prevent relative rotation therebetween; and
- the recirculation paths arranged radially inwardly of an outer surface of the metal core.

9. The screw nut of claim 8 wherein the plastic outer shell includes an axial position control feature.

10. The screw nut of claim 8 wherein the plastic outer shell includes a lateral position control feature.

11. The screw nut of claim 8 further comprising a locating feature configured to orient the metal core for a molding process of the screw nut.

12. The screw nut of claim 11, wherein the locating feature is a cavity that extends axially from an end of the metal core.

13. The screw nut of claim 8 wherein the anti-rotation feature includes a thinner portion circumferentially between the recirculation units and a thicker portion covering the recirculation units.

* * * * *